US012732369B1

(12) United States Patent
Boyraz et al.

(10) Patent No.: US 12,732,369 B1
(45) Date of Patent: Sep. 8, 2026

(54) CROSS-SCHEME CRYPTOGRAPHIC VERIFICATION IN A DISTRIBUTED LEDGER

(71) Applicant: Ava Labs, Inc., New York, NY (US)

(72) Inventors: Furkan Boyraz, Istanbul (TR); Emre Kaan Satiş, Istanbul (TR); Mehmet Berat Öztürk, Istanbul (TR)

(73) Assignee: Ava Labs, Inc., New York, NY (US)

( * ) Notice: Subject to any disclaimer, the term of this patent is extended or adjusted under 35 U.S.C. 154(b) by 0 days.

(21) Appl. No.: 19/544,126

(22) Filed: Feb. 19, 2026

(51) Int. Cl.
*H04L 9/32* (2006.01)
*H04L 9/00* (2022.01)
*H04L 9/08* (2006.01)

(52) U.S. Cl.
CPC ............ *H04L 9/3218* (2013.01); *H04L 9/008* (2013.01); *H04L 9/0825* (2013.01)

(58) Field of Classification Search
CPC ...... H04L 9/3218; H04L 9/008; H04L 9/0825
USPC .......................................................... 713/168
See application file for complete search history.

(56) References Cited

U.S. PATENT DOCUMENTS 11,017,392 B2 * 5/2021 Ma ........................ H04L 9/3255
12,462,253 B2 * 11/2025 Boyraz ................ G06Q 20/401
2011/0026781 A1 * 2/2011 Osadchy ................ G06V 40/16 382/118
2019/0311351 A1 * 10/2019 Zhang .................... G06Q 20/36
2022/0004654 A1 * 1/2022 Patel ..................... G06F 21/602
2025/0182109 A1 * 6/2025 Boyraz ................ G06Q 20/401
2025/0384442 A1 * 12/2025 Boyraz ................ G06Q 20/401

* cited by examiner

*Primary Examiner* — Teshome Hailu
(74) *Attorney, Agent, or Firm* — McDermott Will & Schulte LLP

(57) ABSTRACT

Various aspects of the subject technology relate to systems and methods for confidential value transfer in a distributed ledger system. Aspects may include encrypting a transfer value using a first homomorphic encryption scheme to generate a first ciphertext and encrypting the transfer value using a second homomorphic encryption scheme, different and incompatible with succinct zero-knowledge proof systems, to generate a second ciphertext. Aspects may further include generating a cryptographic commitment for the transfer value. Aspects may further include generating a first proof proving valid encryption under the second homomorphic encryption scheme and a second Sigma proof establishing a relationship between the second homomorphic encryption scheme and the cryptographic commitment, and a zero-knowledge proof establishing a relationship between the first ciphertext and the cryptographic commitment. Aspects may further include submitting, based on successful verification of the proof, the ciphertexts, the cryptographic commitment, and the proofs to the distributed ledger system.

18 Claims, 8 Drawing Sheets

CROSS-SCHEME CRYPTOGRAPHIC VERIFICATION IN A DISTRIBUTED LEDGER

TECHNICAL FIELD

The present disclosure relates to a bridging homomorphic encryption protocol for confidential transactions in a distributed ledger system. The protocol employs multiple ciphertext representations of a common value, including a secondary homomorphic balance-recovery encryption scheme, and binds the representations using zero-knowledge proofs to enable efficient plaintext recovery for large values while preserving confidentiality. Verification under the bridging homomorphic encryption protocol enforces consistency across all cryptographic artifacts, preventing divergence between encrypted representations across different cryptographic systems.

BACKGROUND

Distributed ledger and blockchain-based systems increasingly seek to support confidential transactions in which transaction values and account balances are concealed while still allowing the system to verify correctness, prevent double spending, and maintain consistency across participants. To this end, various cryptographic techniques have been employed that enable operations to be performed directly on encrypted data, such that balances may be updated or transferred without revealing underlying plaintext values. These techniques are often combined with cryptographic proofs and commitments to allow third parties to verify that encrypted operations were performed correctly without learning sensitive information.

However, in many existing systems, encrypted values are not directly recoverable in numeric form upon decryption and instead require additional computational procedures to determine the underlying plaintext value. In particular, recovering a usable balance from an encrypted representation may require solving computationally intensive mathematical problems, which can become increasingly costly and time-consuming as the magnitude of the encrypted value grows. Prior approaches have attempted to mitigate this by decomposing values into multiple components or by relying on auxiliary cryptographic constructions, but such techniques typically increase storage requirements, proof complexity, verification overhead, and system implementation complexity. As a result, conventional approaches to confidential balance recovery and verification often involve trade-offs among efficiency, scalability, and practical usability in transaction-oriented systems.

BRIEF SUMMARY

The subject disclosure provides systems and methods for implementing secure and privacy-preserving transfers in a distributed ledger system. In particular, the disclosed techniques enable a transfer value to be represented under multiple cryptographic constructions and bound together using cryptographic proofs According to embodiments, a computer-implemented method for implementing secure transfers in a distributed ledger system is provided. The method includes encrypting a transfer value using a first homomorphic encryption scheme to generate a first ciphertext and encrypting the transfer value using a second homomorphic encryption scheme to generate a second ciphertext. The method further includes generating a cryptographic commitment committing a plaintext message corresponding to the transfer value using a commitment scheme. The method further includes generating a first proof establishing correctness of the second ciphertext under the second homomorphic encryption scheme, generating a second proof establishing equality between the transfer value encrypted in the second ciphertext and the plaintext message committed in the cryptographic commitment, and generating a zero-knowledge proof establishing equality between the transfer value encrypted in the first ciphertext and the plaintext message committed in the cryptographic commitment. The method further includes submitting the first ciphertext, the second ciphertext, the cryptographic commitment, the first proof, the second proof, and the zero-knowledge proof to the distributed ledger system.

According to embodiments, a system is provided that includes one or more processors and a memory storing instructions which, when executed by the one or more processors, cause the system to perform operations for implementing secure transfers in a distributed ledger system. The operations include encrypting a transfer value under a first homomorphic encryption scheme to generate a first ciphertext and under a second homomorphic encryption scheme to generate a second ciphertext, generating a cryptographic commitment to a plaintext message corresponding to the transfer value, generating a first proof establishing correctness of the second ciphertext, generating a second proof establishing equality between the second ciphertext and the cryptographic commitment, generating a zero-knowledge proof establishing equality between the first ciphertext and the cryptographic commitment, and submitting the cryptographic artifacts to the distributed ledger system for verification.

According to embodiments, a non-transitory computer-readable medium is provided that stores instructions for implementing secure transfers in a distributed ledger system. The instructions, when executed by a computing device, cause the computing device to encrypt a transfer value using first and second homomorphic encryption schemes to generate respective ciphertexts, generate a cryptographic commitment committing a plaintext message corresponding to the transfer value, generate a first proof establishing correctness of the second ciphertext, generate a second proof establishing equality between the second ciphertext and the cryptographic commitment, generate a zero-knowledge proof establishing equality between the first ciphertext and the cryptographic commitment, and submit the ciphertexts, the cryptographic commitment, and the proofs to the distributed ledger system.

These and other embodiments will become clear to one of ordinary skill in the art, in view of the following.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
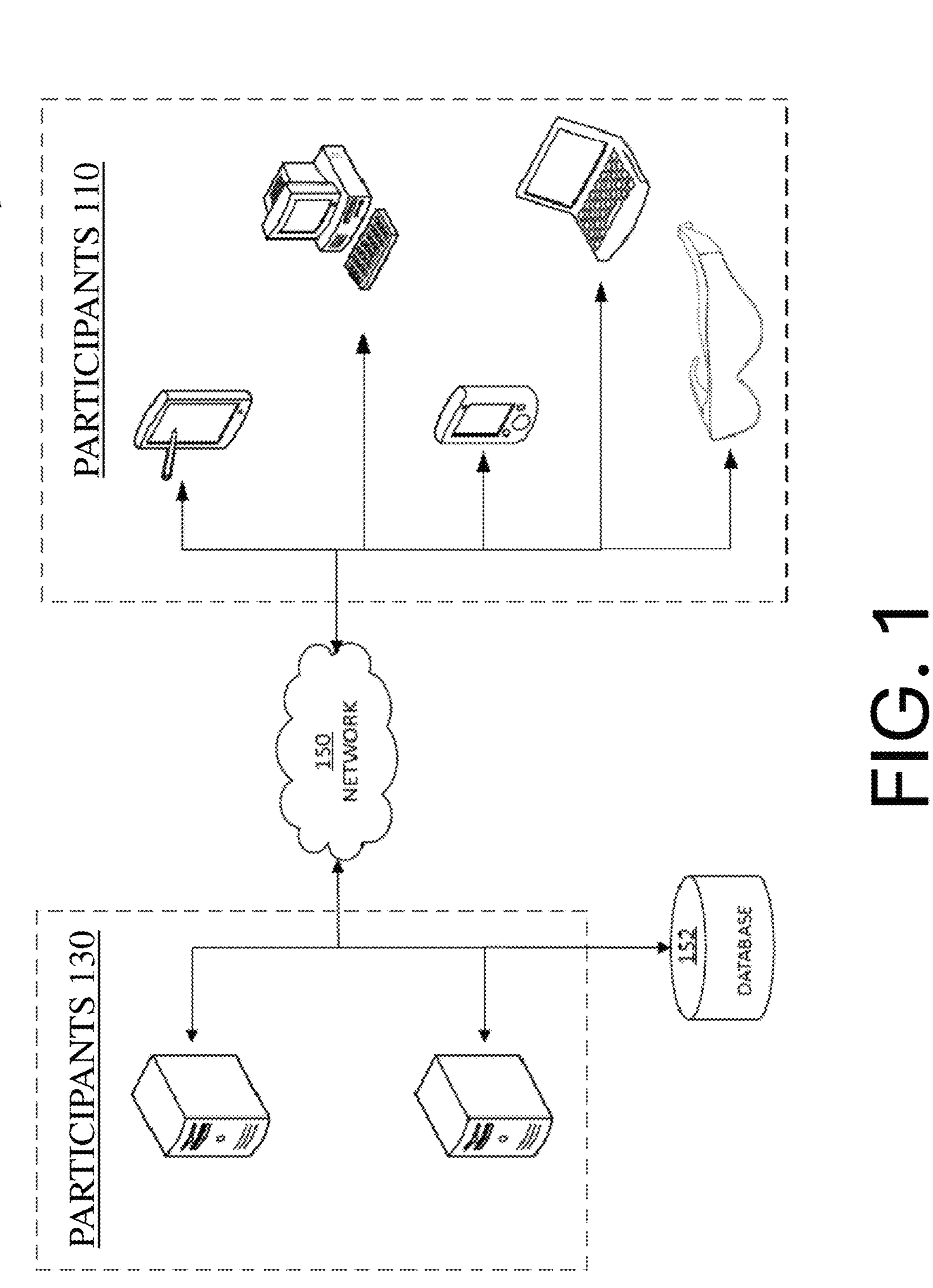
FIG. 1 is a block diagram of a device operating environment with which aspects of the present disclosure can be implemented.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

General Overview

Distributed ledger and blockchain systems increasingly employ cryptographic techniques to enable confidential transactions in which transaction amounts and account balances are hidden while still permitting public verification of correctness. Additively homomorphic encryption schemes, such as Elliptic Curve ElGamal Encryption (ECEG), are commonly used to support private balance updates and transfers, particularly in systems that rely on zero-knowledge proof systems (for example, Zero-Knowledge Succinct Non-Interactive Argument of Knowledge (zkSNARK) circuits), due to their compatibility with circuit-friendly group operations. In such systems, encrypted balances are typically represented as elliptic-curve points, enabling homomorphic accumulation and confidential payments without requiring receivers to scan an entire transaction history. However, elliptic-curve-based encryption systems require solving discrete logarithm computations after decryption to recover underlying numeric values.

In practice, recovery of plaintext values from encrypted elliptic-curve representations may require solving computationally intensive mathematical problems (for example, Elliptic Curve Discrete Logarithm Problem (ECDLP)), the complexity of which increases as the magnitude of the encrypted values grows. As a result, such recovery may become impractical or inefficient for large values, thereby constraining the maximum balance that can be feasibly recovered (for example, about 232-240) using conventional encryption techniques. The maximum balance range can be extended by decomposing values using Chinese Remainder Theorem (CRT) techniques and encrypting multiple residues separately. However, these methods continue to rely on recovery mechanisms such as ECDLP, imposing bounded limits on recoverable values. Extending these limits requires increasing the size or number of encrypted components, which in turn increases storage requirements, hashing and state-commitment overhead, and proof-generation and verification costs. Additionally, storage consumption per user increases proportionally to the number of primes, and committing ciphertexts to a state tree structure requires hashing each component, resulting in increased computational complexity and reduced system efficiency.

Other homomorphic encryption schemes, such as Paillier encryption, are known to support efficient decryption of large integer values and allow efficient recovery of plaintext values upon decryption. Paillier ciphertexts directly encrypt integers and do not require solving discrete logarithms to recover plaintext values. However, Paillier encryption relies on modular arithmetic over large composite moduli and is generally incompatible with zkSNARK circuits, as proving Paillier encryption relations within zkSNARK circuits over a prime field requires expensive non-native big-integer arithmetic and exponentiation.

Because proof mechanisms such as Paillier encryption are not natively compatible with zk-proof frameworks, they cannot readily leverage the verification, composability, and privacy-preserving properties provided by zk-proof frameworks, such as publicly verifying the validity of encrypted data without revealing underlying values. As a result, such proof mechanisms typically operate independently from broader zero-knowledge verification frameworks, and their use does not readily integrate with systems designed for unified, publicly verifiable validation of encrypted data (for example, distributed ledger environments).

Embodiments, as disclosed herein, provide a solution to the above-mentioned problems rooted in computer technology, namely, a bridging homomorphic encryption protocol configured to provide confidentiality for transactions in a distributed ledger system. According to embodiments, the bridging homomorphic encryption protocol leverages multiple cryptographic representations of a common underlying value together with cryptographic proof mechanisms that establish consistency among those representations without revealing the underlying plaintext. The protocol is configured to enable confidential value transfers and balance tracking while supporting efficient verification and balance recovery, and to enforce correctness and consistency of encrypted data across different cryptographic components through verifiable binding relationships.

According to embodiments, the bridging homomorphic encryption protocol employs two different homomorphic encryption schemes bound by a commitment scheme. In some embodiments, at least one of the homomorphic encryption schemes is operable within a zk proofing system, for example, ECEG, while the second homomorphic encryption scheme is used for balance-recovery, for example, Paillier, to assist in efficient decryption of encrypted balances by a recipient. The bridging homomorphic encryption protocol utilizes ciphertext representations produced by both homomorphic encryption schemes of a common value together with zero-knowledge proofs to enable efficient plaintext recovery for large values. In some embodiments, the bridging homomorphic encryption protocol generates a first (ElGamal) ciphertext as the accumulator-facing, zk-friendly commitment of a user's positive balance, and a second (Paillier) ciphertext corresponding to the same balance that enables unbounded, plaintext balance recovery by the receiver. Accordingly, in some embodiments, each user holds one ECEG balance ciphertext and one Paillier balance ciphertext. This approach effectively leverages Paillier's ability to encrypt extremely large values without impacting decryption speed which means users only decrypt their Paillier ciphertexts to learn their balances. The ECEG ciphertext is then used as a commitment within the zkSNARK circuit to prove knowledge of the underlying encrypted value, which was obtained from the Paillier decryption.

According to embodiments, in view of Paillier's incompatibility with zk-proof frameworks, bridging homomorphic encryption protocol relies on separate proof mechanisms, such as Sigma protocols, that are tailored to Paillier ciphertext relations and that operate outside of zk-based verification environments. Under the bridging homomorphic encryption protocol, the zkSNARK is required to verify only a commitment scheme opening and ElGamal relations-both of which are native and efficient to enforce within zk-proof frameworks.

According to embodiments, multiple ciphertext representations of the common underlying value are cryptographically bound using compact Sigma-protocols in conjunction with a commitment scheme. By non-limiting example, the protocol may use a Pedersen commitment scheme which provides information-theoretic hiding and computational binding under standard hardness assumptions and are compatible with both elliptic-curve-based cryptography and zero-knowledge proof systems. In particular, a first Sigma protocol, ZKPoE, is configured to prove correctness of encryption under the Paillier encryption scheme, and a second Sigma protocol is configured to prove equality between the plaintext of the Paillier ciphertext and a corresponding commitment value (for example, Pedersen commitment value). The commitment is further used as an interface to a zero-knowledge proof system that enforces correctness of encrypted operations. This allows the bridging homomorphic encryption protocol to maintain confidentiality by binding multiple ciphertext representations using compact Sigma-protocols, such that correctness and consistency of encrypted values can be verified without revealing the underlying plaintext.

During verification, the verifier checks validity of each proof and enforces consistency across all cryptographic artifacts, including consistency between ciphertexts proven in different proofs and consistency between the commitment used in the Sigma protocols and the commitment enforced by the zero-knowledge proof. In this manner, verification in the bridging homomorphic encryption protocol effectively bridges the different cryptographic representations, preventing a malicious participant from causing divergence between encrypted values across different cryptographic systems, while allowing correctness and consistency to be verified without revealing the underlying plaintext.

According to embodiments, the disclosed bridging homomorphic encryption protocol provides technical improvements in computational efficiency, storage utilization, and verification scalability for confidential transaction processing in distributed computing environments. In particular, the protocol employs compact, constant-size cryptographic proof mechanisms, including a proof of correct encryption (ZKPoE) and a proof of equality (ZKPoEq), that are efficiently verifiable and do not scale with the magnitude of encrypted values. By performing verification of encryption correctness and cross-scheme consistency using ZKPoE and ZKPoEq outside of a zkSNARK circuit, ECDLP bottleneck is eliminated from reading balances. Additionally, integration with zero-knowledge verification logic is achieved without requiring expensive non-native arithmetic operations within the verification circuit, thereby reducing circuit size, proof-generation time, and verification latency on computing platforms that are executing cryptographic validation.

The disclosed subject technology further provides improvements in storage efficiency and state management within distributed ledger systems by maintaining, for each user and each asset, a constant number of encrypted balance representations comprising a first ciphertext under a first homomorphic encryption scheme and a second ciphertext under a second homomorphic encryption scheme. Rather than storing multiple encrypted components corresponding to decomposed value representations, the system stores a fixed and minimal set of ciphertexts while still supporting encrypted accumulation and balance recovery. Moreover, only a subset of these ciphertexts used for homomorphic accumulation participates in state commitment structures, such as Merkle trees, while the ciphertext used for balance discovery is excluded from such structure. This effectively reduces hashing operations, memory usage, and update overhead during transaction processing. Homomorphic updates to the balance-discovery ciphertext are performed using a single modular ciphertext operation, further reducing computational overhead during transaction processing.

By enforcing explicit consistency checks across cryptographic proofs and encrypted representations, the protocol prevents divergence between encrypted states maintained for different operational purposes, such as verification and balance discovery. This unified verification architecture simplifies proof composition, reduces implementation complexity, and enables independent validation of encrypted transactions using standard computing infrastructure. As a result, the protocol enables practical deployment of privacy-preserving payment and accounting systems that scale with transaction volume and value size, while maintaining verifiable correctness and efficient execution within programmable distributed systems.

The disclosed bridging homomorphic encryption protocol enforces consistency checks across cryptographic proofs and encrypted representations, thereby preventing divergence between encrypted states maintained for different operational purposes, such as transaction verification and balance discovery. This verification architecture employs a defined and fixed set of succinct proofs (two Sigma protocol proofs) evaluated together with a zero-knowledge proof (for example, SNARK) and associated cross-proof consistency checks, thereby supporting a more structured and auditable proof composition. In this manner, verification logic may be simplified and implementation complexity reduced, facilitating scalable and auditable private transfer processing within programmable distributed systems.

Collectively, these features represent concrete improvements to computer and network operation, including reduced computational workload, lower memory and storage requirements, and simplified verification pipelines. The disclosed protocol therefore enhances the performance and functionality of distributed transaction systems, enabling secure, confidential, and verifiable value transfers.

According to embodiments, the bridging homomorphic encryption protocol may be implemented within distributed ledger systems using either native verification logic, such as protocol-level precompiles, or executable code deployed within a smart contract framework. Smart contract implementations may provide flexibility across programmable execution environments, while native implementations may offer improved efficiency. In some embodiments, the protocol may be used as part of a decentralized, confidential, and auditable payment system deployed on various blockchain platforms, including, without limitation, customized blockchains, permissioned blockchains, and subnet-based architectures. The protocol is configured to operate within virtual machine-based execution environments and to interoperate with cryptographic verification mechanisms supported by such platforms, enabling validation of encrypted transactions and associated proofs without requiring modification of the underlying execution environment.

Example System Architecture

FIG. 1 illustrates a network architecture 100 used to implement a blockchain framework for privacy-preserving and verifiable on-chain transactions. In the illustrated example, the network architecture 100 supports execution and verification of a bridging homomorphic encryption protocol for confidential value transfers, according to some embodiments.

In the example of FIG. 1, the network architecture 100 includes one or more participants 110 and one or more participants 130 which are communicatively coupled through a network 150. The network 150 may include a wired network (for example, via fiber optic or copper wire, telephone lines, and the like) and/or a wireless network (for example, a satellite network, a cellular network, radiofrequency (RF) network, Wi-Fi, Bluetooth, and the like).

The network 150 may further include one or more of a local area network (LAN), a wide area network (WAN), the Internet, and the like. Further, the network 150 may include, but is not limited to, any one or more of the following network topologies, including a bus network, a star network, a ring network, a mesh network, and the like.

The participants 110 may include any one of a laptop computer, a desktop computer, or a mobile device such as a smart phone, a palm device, a tablet device, a television, a wearable device, a display device, or other device with sufficient computational, storage, and communication resources to execute software implementing various aspects of embodiments and that can be stored in a memory of the device. In some embodiments, the participants 110 may function as client devices for interacting with one or more blockchain networks that implement the bridging homomorphic encryption protocol. The participants 110 may comprise a plurality of nodes for a blockchain network. A node for a blockchain network may comprise an application or other software that records and/or monitors peer connections to other nodes and/or miners for the blockchain network. The nodes may continually record the state of the blockchain and respond to remote procedure requests for information about the blockchain. In some embodiments, aspects of the bridging homomorphic encryption protocol may be implemented at the node level as part of blockchain client software.

In some embodiments, the participants 130 may be a cloud server or a group of cloud servers. In other embodiments, some or all of the participants 130 may not be cloud-based servers (i.e., may be implemented outside of a cloud computing environment, including but not limited to an on-premises environment), or may be partially cloud-based. Some or all of the participants 130 may be a computing device such as part of a cloud computing server including one or more desktop computers or panels mounted on racks, and/or the like. The panels may include processing boards and also switchboards, routers, and other network devices. In some embodiments, the participants 130 may include the participants 110 as well, such that they are peers.

The participants 110 and/or the participants 130 may function as nodes for one or more blockchains implemented on the network architecture 100. As an example, the participants 110 and/or the participants 130 may execute virtual machines (VMs) that validate blocks and transactions, store distributed ledger data, execute smart contracts, and verify cryptographic proofs associated with confidential transactions implemented using encryption protocols. As a non-limiting example, multiple participants 110 may have access to at least one blockchain network hosted by the participants 130. As another non-limiting example, the participants 130 may provide services such as Internet based services including web2 services and web3 services, for example, to the participants 110.

The participants 130 may store blockchain data in a peer-to-peer (P2P) and/or distributed ledger fashion in a database 152. Database 152 may be a single database or a distributed database. The database 152 may store relevant information including, but not limited to, a shared registry, execution and verification logic, and/or rules for implementing consensus and messaging protocols. The participants 130 may be configured to concurrently implement multiple blockchains of different types, including but not limited to an asset blockchain (for example, for creating new assets, asset exchange, cross-subnet transfers), a metadata blockchain (for example, for coordinating validators, tracking active subnets, and creating new subnets), and a smart contract blockchain (for example, for confidential transaction processing).

Figure 2:
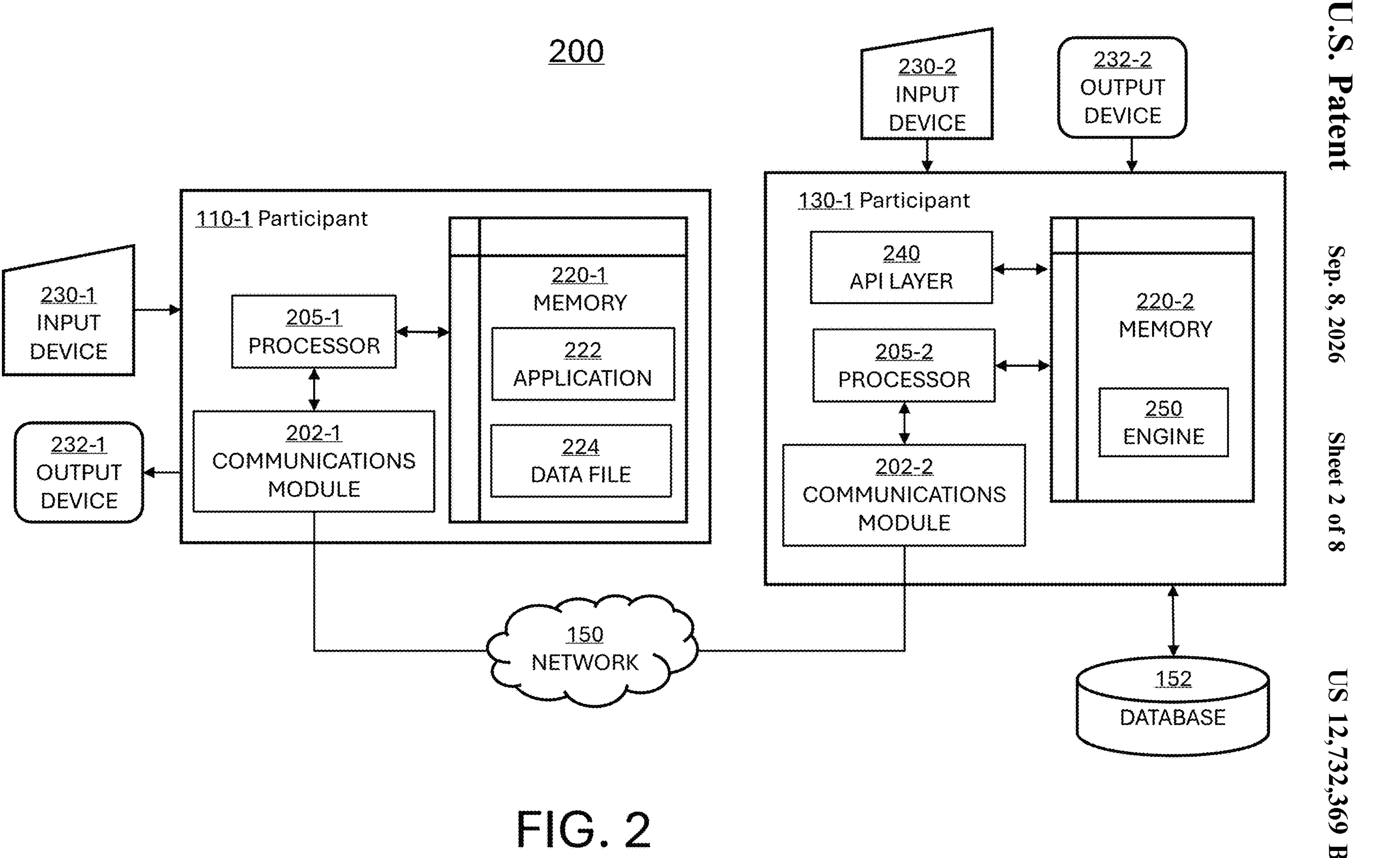
FIG. 2 is a block diagram illustrating details of devices used in the architecture of FIG. 1, according to certain aspects of the present disclosure.

FIG. 2 is a block diagram illustrating details of devices used in the architecture of FIG. 1, according to some embodiments. Specifically, the example of FIG. 2 illustrates an exemplary participant 110-1 (of the participants 110) and an exemplary participant 130-1 (of the participants 130) of the network architecture 100 of FIG. 1. System 200 may implement protocols for blockchain consensus, transaction processing, and cryptographic verification on the network architecture 100.

The participant 110-1 and the participant 130-1 access each other and other devices in the network 150 via corresponding communications modules 202-1 and 202-2, respectively. For example, participant 110-1 and the participant 130-1 may be connected by wired or wireless means to the Internet and support communication with a blockchain distributed ledger with smart contract support via communications modules 202-1 and 202-2. Other embodiments may use different blockchains or non-blockchain based embodiments which may also have utility in some circumstances.

The communications modules 202-1 and 202-2 may be, for example, modems or Ethernet cards, and may include radio hardware and software for wireless communications (for example, via electromagnetic radiation, such as radiofrequency (RF), near field communications (NFC), Wi-Fi, and Bluetooth radio technology). The participant 110-1 and participant 130-1 also include a processor 205-1, 205-2 and memory 220-1, 220-2, respectively. Communications modules 202-1 and 202-2, processors 205-1 and 205-2, and memories 220-1 and 220-2 will be collectively referred to, hereinafter, as "communications modules 202," "processors 205," and "memories 220." Processors 205 may be configured to execute instructions stored in memories 220, to cause participant 110-1 and/or participant 130-1 to perform methods and operations consistent with embodiments of the present disclosure.

The participant 110-1 and the participant 130-1 are coupled to at least one input device 230-1 and input device 230-2, respectively (hereinafter, collectively referred to as "input devices 230"). The input devices 230 can include a mouse, a keyboard, a pointer, a stylus, a touchscreen, a microphone, voice recognition software, a joystick, a virtual joystick, a touch-screen display, and the like. The participant 110-1 and the participant 130-1 are also coupled to at least one output device 232-1 and output device 232-2, respectively (hereinafter, collectively referred to as "output devices 232"). The output devices 232 may include a display (for example, a same touchscreen display used as an input device), a speaker, an alarm, and the like. A user may interact with participant 110-1 and/or participant 130-1 via the input devices 230 and the output devices 232.

The participant 110-1 can implement and/or manage the blockchain framework described herein by application 222 executing within memory 220-1 and couple with input devices 230 and output devices 232. The application 222 may be downloaded by a user from participant 130-1, and/or may be hosted by participant 130-1. The application 222 includes specific instructions which, when executed by processor 205-1, perform operations consistent with embodiments of the present disclosure.

In some embodiments, application 222 runs on an operating system (OS) installed on participant 110-1. In some embodiments, application 222 may run within a web browser, wallet, finance application, or the like. In some embodiments, the processor 205-1 is configured to control a graphical user interface (GUI) (spanning at least a portion of input devices 230 and output devices 232) for the user of participant 110-1 to access participant 130-1. According to some embodiments, application 222 may include encryption and decryption schemes that can be downloaded and installed in participant 110-1. Various aspects of the encryption and decryption schemes may be implemented in software executed by the user devices. By non-limiting example, the software may make use of existing smart wallet functionality available on participant 110-1. Other functionality may be implemented remotely, such as, for example, within smart contracts or native verification logic of the blockchain.

Data and files associated with the application 222 may be stored in a local data file 224 stored in memory 220-1, a local database of participant 110-1 or participant 130-1, or an external database (for example, database 152, a distributed database, and the like). The participant 110-1 may be used to perform blockchain-related operations including, without limitation, transaction submission, encrypted value transfers, validation requests, and smart contract interactions.

Participant 130-1 includes an application programming interface (API) layer 240, configured to provide data, instructions, or updates to application 222 in participant 110-1. API layer 240 may facilitate communication between client devices and blockchain services implementing the bridging homomorphic encryption protocol.

In some embodiments, memory 220-2 of participant 130-1 includes a blockchain engine 250 configured to perform operations consistent with embodiments of the present disclosure. The blockchain engine 250 may provide execution, verification, and data services associated with confidential transactions, cryptographic proof verification, and state management. The user may access the blockchain engine 250 through application 222 executing on participant 110-1.

Encryption Scheme Framework

Figure 3:
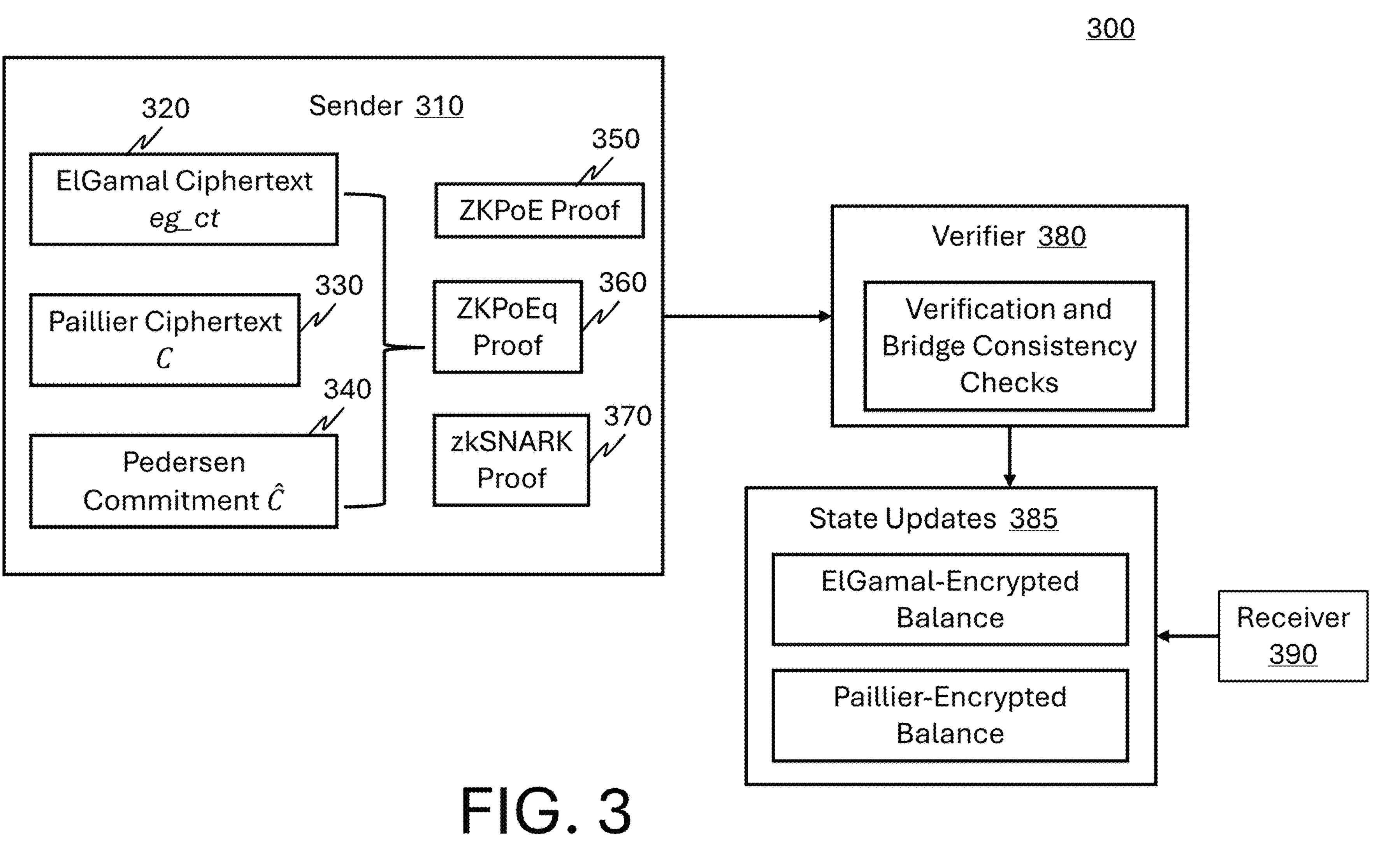
FIG. 3 illustrates a verification architecture for bridging multiple homomorphic encryption schemes using a bridging homomorphic encryption protocol, according to certain aspects of the present disclosure.

FIG. 3 illustrates a verification architecture 300 for bridging multiple homomorphic encryption schemes using a bridging homomorphic encryption protocol, according to one or more embodiments. The verification architecture 300 is configured to bind multiple homomorphic encryption representations of a common plaintext value across heterogeneous proof systems.

As shown in FIG. 3, for a given transaction, a sender 310 generates an ElGamal ciphertext 320 (eg_ct) encrypting a value m under a recipient's ElGamal public key, a Paillier ciphertext 330 (C) encrypting the same value m under the recipient's Paillier public key N (for example, C=Enc_N(m; r)), and a Pedersen commitment 340 ($\hat{C}$) committing to the same value m. The ElGamal ciphertext 320 is used for homomorphic accumulation of a positive balance and functions as the SNARK-bound commitment of the balance. The Paillier ciphertext 330 is used by receiver 390 to learn the actual numeric balance quickly and at arbitrary size. This dual-ciphertext, single-value design enables the bridging homomorphic encryption protocol to efficiently combine the homomorphic accumulation and zero-knowledge-proof compatibility of a first encryption scheme with the efficient plaintext recovery and large-value capacity of a second encryption scheme, without requiring non-native arithmetic for the second encryption scheme within a zkSNARK circuit.

According to embodiments, the ElGamal and Paillier encryption schemes are used for exemplary purposes and are not intended to limit the homomorphic encryption schemes bound by the bridging homomorphic encryption protocol. In some embodiments, the first homomorphic encryption scheme is selected to be efficiently operable within a zkSNARK circuit, while the second homomorphic encryption scheme is incompatible with zkSNARKs and is instead verified using an external zero-knowledge proof system that is cryptographically bridged to the zkSNARK through a cryptographic commitment. According to embodiments, Pedersen commitment is used for exemplary purposes and is not intended to limit the cryptographic commitment used. In some embodiments, verification architecture 300 uses any cryptographic commitment or binding representation that is efficiently verifiable within a zero-knowledge proof system and capable of linking values across heterogeneous encryption schemes.

According to embodiments, the sender 310 generates a ZKPoE proof 350 proving correct formation of the Paillier ciphertext 330 using a first Sigma protocol. The ZKPoE proof 350 prevents malformed/malleated Paillier cipher texts. In some implementations, the ZKPoE proof 350 proves that Paillier ciphertext 330 (C) is of the form:

$$C=(1+N)^m \cdot r^N \bmod N^2 \quad \text{(Eq. 1)}$$

under the receiver's modulus N, serving as a proof for correct Paillier encryption without revealing the plaintext value m or the encryption randomness r. The sender 310 also generates a ZKPoEq proof 360 proving equality between the plaintext value m in the Paillier ciphertext 330 using a second Sigma protocol and a message (corresponding to the plaintext value m) committed in the Pedersen commitment 340. As such, the ZKPoEq proof 360 binds the Paillier plaintext value m to the Pedersen message. In some embodiments, the Pederson commitment 340 (Ĉ) can be represented by:

$$\hat{C}=G^m \cdot H^\rho \quad \text{(Eq. 2)}$$

which can be computer over, for example, the Baby-Jubjub elliptic curve using independent commitment randomness p. The Baby-Jubjub elliptic curve is an exemplary twisted Edwards curve optimized for high security and efficiency in zero-knowledge proofs, such as the zk-SNARKs.

According to embodiments, the first Sigma protocol and the second Sigma protocol are executed external to a zkSNARK circuit underlying a zkSNARK proof 370.

The sender 310 also generates a zkSNARK proof 370 enforcing ledger constraints and proving that the ElGamal ciphertext 320 corresponds to the same value m that opens the Pedersen commitment 340 (Ĉ). The zkSNARK proof 370 binds the message (m) in the Pedersen commitment 340 to the ElGamal amount used for state transitions by proving that the ElGamal ciphertext 320 encrypts the same m as enforced via the Pedersen opening and all protocol constraints hold (for example, ASC transitions, inflow/outflow Merkle membership, nullifier, etc.). Note, the Pederson commitment 340 is used as input for generating the zkSNARK proof 370, rather than the Paillier ciphertext 330, because the ZKPoEq proof 360 already shows that both the Pedersen commitment 340 and the Paillier ciphertext 330 encrypt the same value m. Accordingly, the two encryption schemes (that is, Paillier and ElGamal) are bridged efficiently by Pedersen commitment 340 and are proven using the zkSNARK proof 370.

The sender 310 submits all the cryptographic artifacts, including the ElGamal ciphertext 320, the Paillier ciphertext 330, the Pedersen commitment 340, the ZKPoE proof 350 proving correct Paillier encryption, the ZKPoEq proof 360 proving equality between the Paillier ciphertext 330 and the Pedersen commitment 340, and the zkSNARK proof 370, which are submitted to a verifier 380. The sender 310 may also submit additional information including, but not limited to, public inputs associated with the sender, message, or value m to the verifier 380. According to embodiments, only succinct cryptographic artifacts are made public, including the ZKPOE proof 350, the ZKPoEq proof 360, and associated commitments. As such, verification architecture 300 ensures no plaintext values and no Paillier encryption randomness are revealed, preserving the privacy between encryption schemes using the bridging homomorphic encryption protocol.

The verifier 380 is configured to individually verify the zkSNARK proof 370, the ZKPoE proof 350, and the ZKPoEq proof 360. In some embodiments, verifying the zkSNARK proof 370 comprises checking that the zkSNARK proof 370 validates ElGamal correctness, Merkle memberships, nullifiers, account transitions, and that the Pedersen commitment C opens to the same value m used by the zkSNARK arithmetic circuit underlying the zkSNARK proof 370. The verifier 380 further executes bridge consistency checks to ensure that the Paillier ciphertext 330 proven in the ZKPoE proof 350 and the ZKPoEq proof 360 are identical, and that the Pedersen commitment 340 referenced in the ZKPoEq proof 360 is identical to the Pedersen commitment 340 enforced by the zkSNARK proof 370. By enforcing these consistency checks, the verifier 380 cryptographically binds the zkSNARK proof 370 and the ZKPoE proof 350 and the ZKPoEq proof 360 to a common underlying value.

According to embodiments, the verifier 380 rejects a transaction if any bridge consistency condition fails. By non-limiting example, a transaction is rejected if the Paillier ciphertext C referenced in the ZKPoE proof 350 differs from the Paillier ciphertext C referenced in the ZKPoEq proof 360. As another non-limiting example, if the Pedersen commitment C referenced in the ZKPoEq proof 360 differs from the Pedersen commitment C enforced by the zkSNARK proof 370, the transaction is rejected.

Upon successful verification and consistency checking by verifier 380, the distributed ledger performs corresponding state updates 385 based on the transaction, including homomorphic updates to the receiver's (for example, receiver 390) encrypted balance values. A stored ElGamal-encrypted positive balance is homomorphically updated using the ElGamal ciphertext 320 (that is, homomorphically add eg_ct) and a stored Paillier-encrypted balance is homomorphically updated using the Paillier ciphertext 330. In some embodiments, the Paillier ciphertext 330 is homomorphically added by ciphertext multiplication, as follows:

$$C\_total \leftarrow C\_total \cdot C \bmod N^2 \quad \text{(Eq. 3)}$$

In some embodiments, if the receiver 390 does not have a stored Paillier-encrypted balance yet, the Paillier-encrypted balance is set to the Paillier ciphertext 330 (that is, stored Paillier-encrypted balance←C). Accordingly, storage is constant as only one Paillier ciphertext is stored per user. Receiver 390 can subsequently decrypt the Paillier-encrypted balance to recover the plaintext balance value m without performing discrete-logarithm computation, while relying on the bridge guarantees to ensure consistency with the ElGamal-encrypted ledger state.

In some embodiments, an inflow Merkle tree leaf committing the ElGamal ciphertext 320 to an incremental Merkle tree (IMT) is generated. In some implementations, the leaf hash commits a hash of ElGamal ciphertext 320 eg_ct, an address, and a token ID. Merkalizing the ElGamal ciphertext 320 enables SNARK-friendly membership verification. The Paillier ciphertext 330 is excluded from Merkleization in the IMT and is not provided as input to the zkSNARK circuit, because the Paillier ciphertext is used by the receiver solely for balance discovery-which further enhances efficiency and reduces storage requirements.

According to embodiments, receiver 390 can perform a single Paillier decryption of the Paillier ciphertext 330 using the recipient's private key to learn the value m, reducing the computational burden associated with, for example, scanning or trial decryption over an IMT, ECDL computations, or reconstruction operations. Because the ElGamal ciphertext 320 and the Paillier ciphertext 330 are cryptographically bound via the Pedersen commitment 340 and the ZKPOE proof 350 and the ZKPoEq proof 360, the recovered value m is guaranteed to correspond to the same value accumulated in the ElGamal ciphertext 320 and enforced by the zkSNARK proof 370. Accordingly, the receiver's readable balance is bounded by the Paillier modulus, which permits encryption of extremely large values without impacting decryption speed, thereby enabling effectively unbounded plaintext values that are not feasibly recoverable via ECDLP computations.

Figure 4:
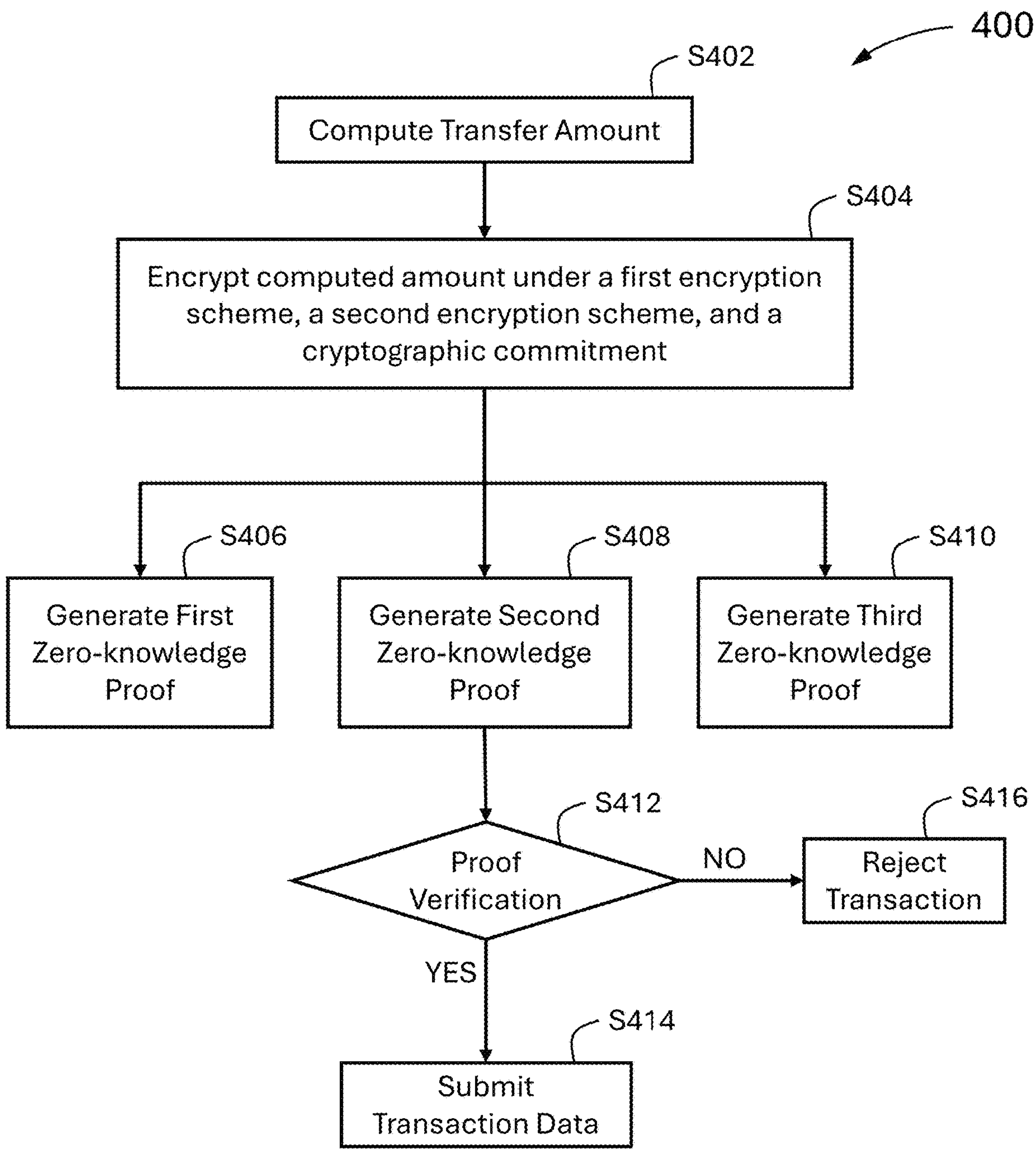
FIG. 4 illustrates an exemplary transaction workflow for generating and submitting a confidential transfer under the bridging homomorphic encryption protocol, according to certain aspects of the present disclosure.

FIG. 4 illustrates an exemplary transaction workflow 400 for generating and submitting a confidential transfer under the bridging homomorphic encryption protocol, according to some embodiments.

At step 402, a transfer amount is computed. According to some embodiments, step 402 further includes determining any required splits or amount decomposition under the protocol rules (for example, fee assessment, change computation, or other value-splitting logic applicable to the transaction) based on the transfer amount.

At step 404, the computed amount is encrypted under multiple cryptographic representations. According to some embodiments, the sender encrypts the transfer amount using a first encryption scheme, a second encryption scheme, and a cryptographic commitment. According to some embodiments, the first encryption scheme is natively enforceable within a zkSNARK circuit, and the second encryption scheme is not natively enforceable within the zkSNARK circuit and is validated using a zero-knowledge proof external to the zkSNARK circuit. The first encryption scheme can be used to generate a first ciphertext (for example, eg_ct) encrypting the amount under a receiver's first public key using curve-native operations. The second encryption scheme can be used to generate a second ciphertext (for example, C) encrypting the amount under the receiver's second public key (for example, N). Additionally, the cryptographic commitment (for example, $\hat{C}$) commits to the amount (for example, as defined in Eq. 2).

At step 406, a first zero-knowledge proof (for example, ZKPoE (N, C)) is generated based on the second ciphertext. According to some embodiments, the first zero-knowledge proof proves that the second ciphertext is a valid encryption under the second encryption scheme with respect to the second public key, without revealing the plaintext or encryption randomness.

At step 408, a second zero-knowledge proof (for example, ZKPoEq (N, C, $\hat{C}$)) is generated based on the second ciphertext and the cryptographic commitment. According to some embodiments, the second zero-knowledge proof proves that the amount encrypted in the second ciphertext is equal to the amount committed in the cryptographic commitment, thereby cryptographically binding the second encryption scheme to the cryptographic commitment.

At step 410, a third zero-knowledge proof (for example, zkSNARK) is generated based on the first ciphertext and the cryptographic commitment. According to some embodiments, the third zero-knowledge proof proves that the first ciphertext encrypts the same amount as the cryptographic commitment. According to some embodiments, the third zero-knowledge proof also enforces protocol-level constraints, including account state transition rules, inflow or outflow membership conditions, nullifier constraints, and balance-conservation rules defined by the protocol.

At step 412, proof verification is executed. According to some embodiments, the proof verification includes verifying that the first zero-knowledge proof is valid, that the second zero-knowledge proof is valid, that the third zero-knowledge proof is valid, that the second ciphertext proven in the first zero-knowledge proof matches the second ciphertext proven in the second zero-knowledge proof (for example, C in ZKPoE is equal to C in ZKPoEq), and that the cryptographic commitment used in the second zero-knowledge proof matches the cryptographic commitment proven in the third zero-knowledge proof (for example, $\hat{C}$ in ZKPoEq is equal to $\hat{C}$ in zkSNARK).

At step 414, upon successful verification of all proofs and consistency checks (YES at step 412), transaction data is submitted. According to some embodiments, the transaction data can include, for example, the first ciphertext, the second ciphertext, cryptographic commitment, the first, second, and third zero-knowledge proofs, and associated public inputs. A respective receiver can accept the submitted transaction, resulting in, for example, homomorphically encrypted state value updates while ensuring that a same plaintext amount is consistently bound across multiple cryptographic representations.

At step 416, based on at least the proofs and consistency checks failing during proof verification (NO at step 412), the transaction is rejected. By non-limiting example, if the first zero-knowledge proof is invalid, then the transaction is rejected.

Figure 5:
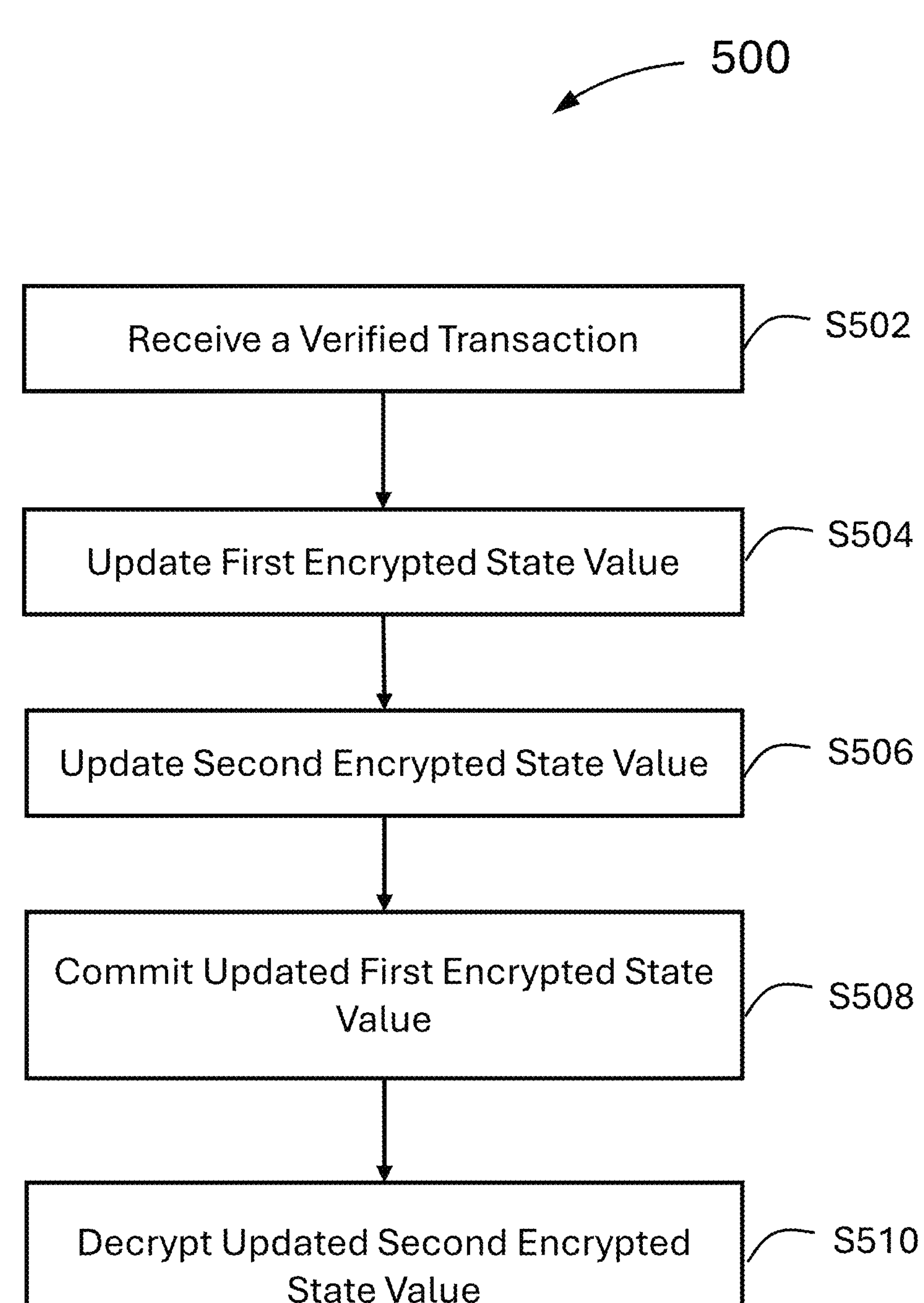
FIG. 5 illustrates an exemplary balance discovery/decryption workflow for processing a verified confidential transaction under the bridging homomorphic encryption protocol, according to certain aspects of the present disclosure.

FIG. 5 illustrates an exemplary balance discovery/decryption workflow 500 for processing a verified confidential transaction under the bridging homomorphic encryption protocol, according to some embodiments.

At step 502, a receiver receives a transaction that has been verified and accepted following proof verification (for example, after a YES determination at step 412 of FIG. 4). According to some embodiments, the received transaction includes at least a first ciphertext (for example, eg_ct) generated under a first encryption scheme and a second ciphertext (for example, C) generated under a second encryption scheme and a set of proofs.

At step 504, a first encrypted state value is updated based on the first ciphertext. According to some embodiments, the first ciphertext is homomorphically combined with a previously stored first encrypted state value associated with the receiver using operations defined by the first encryption scheme, thereby updating an encrypted balance or accumulator without revealing a plaintext amount.

At step 506, a second encrypted state value is updated based on the second ciphertext. According to some embodiments, the second ciphertext is homomorphically combined with a previously stored second encrypted state value associated with the receiver using operations defined by the second encryption scheme. If no prior second encrypted state value exists, the second ciphertext can be stored as an initial encrypted state value.

In some embodiments, the homomorphic combination is performed by ciphertext multiplication modulo $N^2$, where N is a Paillier modulus associated with the receiver's Paillier public key. According to some embodiments, the receiver determines whether a Paillier-encrypted state value is already stored. If no prior Paillier-encrypted state value exists, the receiver initializes the Paillier-encrypted state value using the received Paillier ciphertext. If a prior Paillier-encrypted state value exists, the receiver homomorphically aggregates the received Paillier ciphertext with the stored Paillier-encrypted state value.

At step 508, the updated first encrypted state value is committed to a cryptographic data structure. According to some embodiments, the updated first encrypted state value is committed to a Merkle tree by computing a hash over the updated first encrypted state value and associated metadata, thereby enabling efficient membership proofs for subsequent protocol operations.

At step 510, the updated second encrypted state value is decrypted using a private key corresponding to the receiver's second public key (described with reference to FIG. 4) to obtain a plaintext amount. According to some embodiments, decryption of the second encrypted state value yields the plaintext amount directly, without requiring discrete logarithm computation or trial decryption. According to some embodiments, the receiver determines the plaintext amount as a readable balance or transaction value. Due to the set of proofs included in the transaction and enforced by proof verification and consistency checks (for example, described with respect to FIG. 4), the receiver can rely on the plaintext amount obtained from decryption of the second encrypted state value as being equal to the amount encrypted in the first encrypted state value.

According to some embodiments, the receiver may store, display, or otherwise use the plaintext amount while continuing to maintain encrypted state values under both the first encryption scheme and the second encryption scheme. According to some embodiments, the receiver is not required to decrypt the first encrypted state value, as the protocol guarantees that the first encrypted state value is consistently bound to the same plaintext amount obtained from decryption of the second encrypted state value.

The techniques described with reference to FIGS. 4-5 may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

In some implementations, one or more operation blocks of FIGS. 4-5 may be performed by a processor circuit executing instructions stored in a memory circuit, in a client device, a remote server or a database, communicatively coupled through a network (for example, processors 205, memories 220, participants 110, participants 130, database(s) 152, and network 150).

For explanatory purposes, steps of the example workflows 400 and 500 are described herein as occurring in serial, or linearly. However, multiple instances of the example workflows 400 and 500 may occur in parallel, overlapping in time, almost simultaneously, or in a different order from the order illustrated in the workflows 400 and 500. Although FIGS. 4-5 shows example blocks of workflows 400 and 500, respectively, in some implementations, the workflows 400 and 500 may include additional blocks, fewer blocks, different blocks, or differently arranged blocks than those depicted in FIGS. 4-5.

Homomorphic Encryption System

Figure 6:
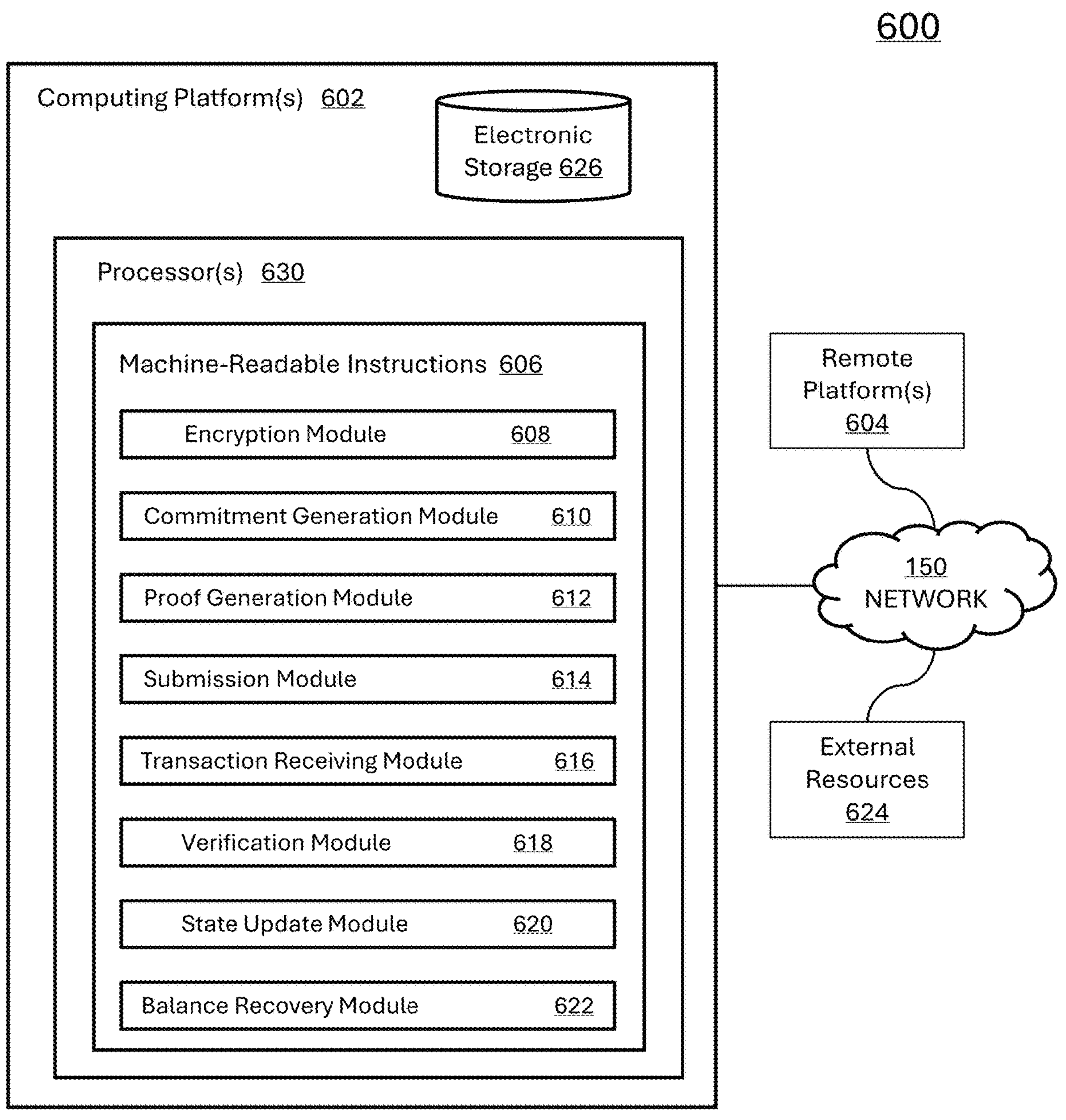
FIG. 6 is a block diagram illustrating a cryptographic verification system implementing aspects of the subject technology, according to certain aspects of the present disclosure.

FIG. 6 is a block diagram illustrating a cryptographic verification system 600 implementing aspects of the subject technology, according to one or more embodiments. System 600 may be implemented within a blockchain network and is configured to verify and enforce confidential transactions using multiple cryptographic representations of a common value that are bound together via proof-bridging mechanisms. According to embodiments, system 600 may be implemented as a verification component of the blockchain, a precompile, a protocol-level execution environment, smart contract, or any combination thereof. Users can interact with system 600 through client applications, such as digital wallets or decentralized applications (dApps), which are configured to construct and submit confidential transactions under the bridging homomorphic encryption protocol.

In some implementations, the system 600 may include one or more computing platforms 602 executing various aspects of the system. The computing platform(s) 602 can correspond to a server component of the blockchain platform, blockchain nodes, validators, execution engines, or native verification environments responsible for transaction validation and state updates, which can be similar to or the same as the computing device(s) of participants 130 of FIG. 1 and include the client computing device(s) of participants 110 of FIG. 1 and include the processors 205 in FIG. 2.

Computing platform(s) 602 may be configured to communicate with one or more remote platforms 604 according to a client/server architecture, a peer-to-peer architecture, and/or other architectures. The remote platform(s) 604 may be configured to communicate with other remote platforms via computing platform(s) 602 and/or according to a client/server architecture, a peer-to-peer architecture, and/or other architectures. The remote platform(s) 604 can be configured to cause output of the system 600 on client device(s) of the remote platform(s) 604 with enabled access (for example, based on analysis by the computing platform(s) 602) according to stored data. The computing platform(s) 602, external resources 624, and remote platform(s) 604 may be in communication and/or mutually accessible via the network 150.

The computing platform(s) 602 may be configured by machine-readable instructions 606. The machine-readable instructions 606 may be executed by the computing platform(s) to implement one or more instruction modules. The instruction modules may include computer program modules. The instruction modules being implemented may include one or more of an encryption module 608, commitment generation module 610, proof generation module 612, submission module 614, transaction receiving module 616, verification module 618, state update module 620, and balance recovery module 622.

An encryption module 608 can be configured to generate multiple ciphertext representations of a common plaintext value using a plurality of homomorphic encryption schemes. According to embodiments, the encryption module 608 may be configured to generate a ciphertext under a first homomorphic encryption scheme using a first public key associated with a receiver, and to generate a ciphertext under a second homomorphic encryption scheme using a second public key associated with the receiver, where both ciphertexts encrypt a same underlying value. In some embodiments, the first homomorphic encryption scheme comprises an elliptic-curve-based ElGamal encryption scheme and the second homomorphic encryption scheme comprises a Paillier encryption scheme. In other embodiments, different homomorphic encryption schemes may be wherein at least one of the homomorphic encryption schemes is efficient to represent and operate within a zero-knowledge proof system, and another of the homomorphic encryption schemes supports efficient plaintext recovery outside of the zero-knowledge proof system.

A commitment generation module 610 can be configured to generate a cryptographic commitment corresponding to the plaintext value encrypted by the encryption module 608. According to embodiments, the commitment generation module 610 may be configured to generate a commitment under a commitment scheme that is compatible with zero-knowledge proof systems, and that commits to the same underlying value encrypted under the first and second homomorphic encryption schemes. In some embodiments, the commitment scheme comprises a Pedersen commitment scheme defined over an elliptic curve group. The commitment generation module 610 may further be configured to output commitment openings or auxiliary data required to prove consistency between the commitment and ciphertexts generated by the encryption module 608.

A proof generation module 612 can be configured to generate one or more zero-knowledge proofs establishing correctness and consistency of cryptographic artifacts associated with a transaction. According to embodiments, the proof generation module 612 may be configured to generate: (i) a first proof, such as a Sigma-protocol proof, establishing correct formation of the ciphertext generated under the second homomorphic encryption scheme; (ii) a second proof, such as a Sigma-protocol equality proof, establishing equality between a plaintext encrypted under the second homomorphic encryption scheme and a message committed under the commitment scheme; and (iii) a zero-knowledge proof, such as a zkSNARK, establishing correctness of a state transition with respect to the ciphertext generated under the first homomorphic encryption scheme and consistency between that ciphertext and the cryptographic commitment. In some embodiments, the second homomorphic encryption scheme comprises Paillier encryption and the commitment scheme comprises a Pedersen commitment.

A submission module 614 can be configured to assemble and submit a transaction payload including the ciphertexts generated under the first and second homomorphic encryption schemes, the cryptographic commitment, and the one or more zero-knowledge proofs generated by the proof generation module 612. According to embodiments, the transaction submission module 614 may be configured to associate each proof with corresponding ciphertexts and commitments, serialize the transaction payload in a canonical format, and submit the payload to the cryptographic verification system 600 for validation.

A transaction receiving module 616 can be configured to receive a submitted transaction payload including cryptographic artifacts associated with a confidential transfer. According to embodiments, the transaction receiving module 616 may parse the received payload, extract ciphertexts generated under the first and second homomorphic encryption schemes, extract the cryptographic commitment, and extract associated zero-knowledge proofs prior to verification.

A verification module 618 can be configured to verify one or more cryptographic proofs and to enforce consistency across cryptographic artifacts associated with a submitted transaction. According to embodiments, the verification module 618 is configured to verify a proof of correct encryption associated with a ciphertext generated under the second homomorphic encryption scheme. According to embodiments, the verification module 618 verifies that the ciphertext generated under the second homomorphic encryption scheme encrypts a value under a specified public key using valid encryption randomness, without revealing the plaintext value and without enforcing non-native arithmetic inside the zero-knowledge proof system. In some embodiments, the second homomorphic encryption scheme comprises Paillier encryption and the proof of correct encryption comprises a Sigma-protocol proof.

According to embodiments, the verification module 618 is configured to verify a proof of equality associated with the transaction. According to embodiments, the verification module 618 verifies that a plaintext encrypted under the second homomorphic encryption scheme is equal to a message committed under the commitment scheme, without revealing the underlying value. In some embodiments, the commitment scheme comprises a Pedersen commitment.

According to some embodiments, verification module 618 is configured to verify a zero-knowledge proof enforcing protocol constraints with respect to a ciphertext generated under the first homomorphic encryption scheme. According to embodiments, the verification module 618 verifies that a cryptographic commitment opens to a value consistent with the ciphertext generated under the first homomorphic encryption scheme and that one or more state-transition constraints are satisfied. In some embodiments, the zero-knowledge proof comprises a zkSNARK and the first homomorphic encryption scheme is selected to be efficient to operate within a zero-knowledge proof system.

According to some embodiments, the verification module 618 is configured to enforce consistency across cryptographic artifacts and proofs associated with the transaction. According to embodiments, the verification module 618 verifies that the ciphertext referenced in the proof of correct encryption corresponds to the ciphertext referenced in the proof of equality, and that the cryptographic commitment referenced in the proof of equality corresponds to the cryptographic commitment enforced by the zero-knowledge proof verified with respect to the first homomorphic encryption scheme. The verification module 618 may reject the transaction upon detecting any inconsistency across proofs, ciphertexts, or commitments.

A state update module 620 can be configured to update encrypted system state upon successful verification of all required proofs and consistency checks (executed by verification module 618). According to embodiments, the state update module 620 may homomorphically combine ciphertexts generated under the first homomorphic encryption scheme and may separately homomorphically combine ciphertexts generated under the second homomorphic encryption scheme. In some embodiments, ciphertexts generated under the first homomorphic encryption scheme participate in authenticated state commitments based on zero-knowledge proof verification, while ciphertexts generated under the second homomorphic encryption scheme are maintained separately for balance recovery.

A balance recovery module 622 can be configured to decrypt an accumulated ciphertext generated under the second homomorphic encryption scheme to recover a plaintext balance value. According to embodiments, the balance recovery module 622 performs decryption using a secret key corresponding to the second homomorphic encryption scheme and outputs the recovered plaintext value to a receiver. According to embodiments, the balance recovery module 622 enables recovery of the plaintext balance value without requiring discrete logarithm computation, trial decryption, or scanning of historical transactions.

In some implementations, the computing platform(s) 602, the remote platform(s) 604, and/or the external resources 624 may be operatively linked via one or more electronic communication links. For example, such electronic communication links may be established, at least in part, via the network 150 such as the Internet and/or other networks. It will be appreciated that this is not intended to be limiting, and that the scope of this disclosure includes implementations in which the computing platform(s) 602, the remote platform(s) 604, and/or the external resources 624 may be operatively linked via some other communication media.

A given remote platform 604 may include client computing devices, which may each include one or more processors configured to execute computer program modules. The computer program modules may be configured to enable an expert or user associated with the given remote platform 604 to interface with the system 600 and/or external resources 624, and/or provide other functionality attributed herein to remote platform(s) 604. By way of non-limiting example, a given remote platform 604 and/or a given computing platform 602 may include one or more of a server, a desktop computer, a laptop computer, a handheld computer, a tablet computing platform, a NetBook, a Smartphone, a gaming console, and/or other computing platforms. The external resources 624 may include sources of information outside of the system 600, external entities participating with the system 600, and/or other resources. For example, the external resources 624 may include externally designed blockchain elements and/or applications designed by third parties. In some implementations, some or all of the functionality attributed herein to the external resources 624 may be provided by resources included in system 600.

Computing platform(s) 602 may include the electronic storage 626, a processor such as the processors 630, and/or other components. The computing platform(s) 602 may include communication lines, or ports to enable the exchange of information with a network and/or other computing platforms. Illustration of the computing platform(s) 602 in FIG. 6 is not intended to be limiting. The computing platform(s) 602 may include a plurality of hardware, software, and/or firmware components operating together to provide the functionality attributed herein to the computing platform(s) 602. For example, the computing platform(s) 602 may be implemented by a cloud of computing platforms operating together as the computing platform(s) 602.

Electronic storage 626 may include non-transitory storage media that electronically stores information. The electronic storage media of the electronic storage 626 may include one or both of system storage that is provided integrally (i.e., substantially non-removable) with computing platform(s) 602 and/or removable storage that is removably connectable to computing platform(s) 602 via, for example, a port (for example, a USB port, a firewire port, etc.) or a drive (for example, a disk drive, etc.). Electronic storage 626 may include one or more of optically readable storage media (for example, optical disks, etc.), magnetically readable storage media (for example, magnetic tape, magnetic hard drive, floppy drive, etc.), electrical charge-based storage media (for example, EEPROM, RAM, etc.), solid-state storage media (for example, flash drive, etc.), and/or other electronically readable storage media. Electronic storage 626 may include one or more virtual storage resources (for example, cloud storage, a virtual private network, and/or other virtual storage resources). Electronic storage 626 may store software algorithms, information determined by the processors 630, information received from computing platform(s) 602, information received from the remote platform(s) 604, and/or other information that enables the computing platform(s) 602 to function as described herein.

Processor(s) 630 may be configured to provide information processing capabilities in computing platform(s) 602. As such, processor(s) 630 may include one or more of a digital processor, an analog processor, a digital circuit designed to process information, an analog circuit designed to process information, a state machine, and/or other mechanisms for electronically processing information. Although processor(s) 630 is shown in FIG. 6 as a single entity, this is for illustrative purposes only. In some implementations, processor(s) 630 may include a plurality of processing units. These processing units may be physically located within the same device, or processor(s) 630 may represent processing functionality of a plurality of devices operating in coordination. Processor(s) 630 may be configured to execute modules 608, 610, 612, 614, 616, 618, 620, and/or 622, and/or other modules. Processor(s) 630 may be configured to execute modules 608, 610, 612, 614, 616, 618, 620, and/or 622, and/or other modules by software; hardware; firmware; some combination of software, hardware, and/or firmware; and/or other mechanisms for configuring processing capabilities on processor(s) 630. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 608, 610, 612, 614, 616, 618, 620, and/or 622 are illustrated in FIG. 6 as being implemented within a single processing unit, in implementations in which processor(s) 630 includes multiple processing units, one or more of modules 608, 610, 612, 614, 616, 618, 620, and/or 622 may be implemented remotely from the other modules. The description of the functionality provided by the different modules 608, 610, 612, 614, 616, 618, 620, and/or 622 described below is for illustrative purposes, and is not intended to be limiting, as any of modules 608, 610, 612, 614, 616, 618, 620, and/or 622 may provide more or less functionality than is described. For example, one or more of modules 608, 610, 612, 614, 616, 618, 620, and/or 622 may be eliminated, and some or all of its functionality may be provided by other ones of modules 608, 610, 612, 614, 616, 618, 620, and/or 622. As another example, processor(s) 630 may be configured to execute one or more additional modules that may perform some or all of the functionality attributed below to one of modules 608, 610, 612, 614, 616, 618, 620, and/or 622.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Homomorphic Encryption Process

Figure 7:
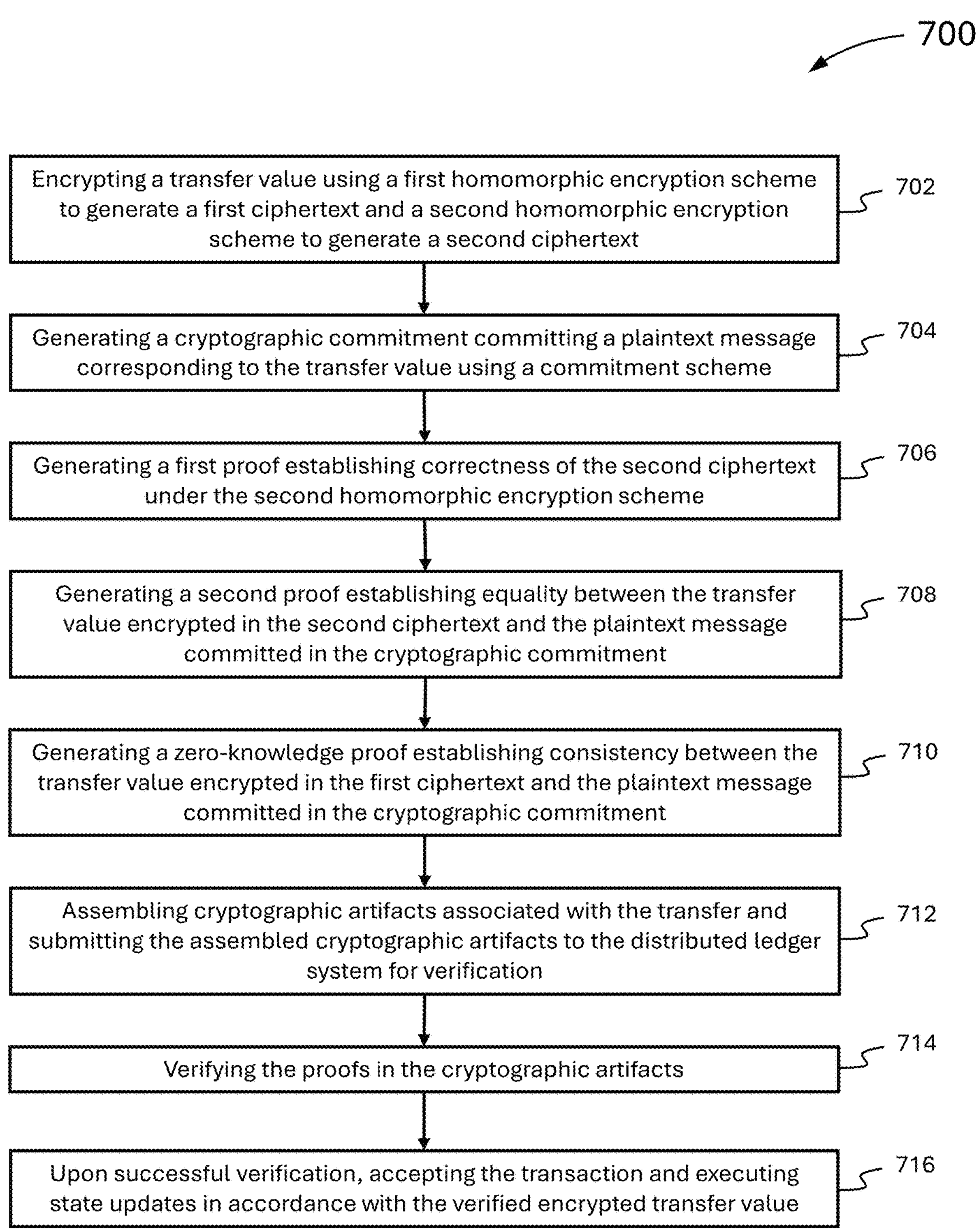
FIG. 7 illustrates a flowchart of an exemplary computer-implemented method for implementing secure transfers in a distributed ledger system, according to certain aspects of the present disclosure.

FIG. 7 illustrates a flowchart of an exemplary computer-implemented method 700 for implementing secure transfers in a distributed ledger system, according to some embodiments.

At operation 702, method 700 includes encrypting a transfer value using a first homomorphic encryption scheme to generate a first ciphertext and a second homomorphic encryption scheme to generate a second ciphertext. According to embodiments, the transfer value may correspond to an amount, balance adjustment, or other plaintext message to be transferred under the distributed ledger protocol. In some embodiments, the method 700 further includes determining an amount split for the transfer value needed for the protocol.

According to embodiments, the first and second homomorphic encryption schemes are distinct schemes that support homomorphic operations. In some implementations, the first and second homomorphic encryption schemes operate over different algebraic groups, with at least one scheme being efficient to enforce within zero-knowledge proof systems. In some implementations, the first homomorphic encryption scheme is compatible with a zero-knowledge proof circuit (for example, ElGamal encryption over an elliptic curve), and the second homomorphic encryption scheme is natively incompatible with the zero-knowledge proof circuit. The second homomorphic encryption scheme may be a composite-modulus homomorphic encryption scheme supporting plaintext recovery for values exceeding a discrete-logarithm-bounded range (for example, Paillier encryption).

At operation 704, method 700 includes generating a cryptographic commitment committing a plaintext message corresponding to the transfer value using a commitment scheme. According to embodiments, the committed plaintext can later be proven consistent with encrypted representations without revealing the plaintext. In some embodiments, the commitment scheme comprises a Pederson commitment scheme.

At operation 706, method 700 includes generating a first proof establishing correctness of the second ciphertext under the second homomorphic encryption scheme. According to embodiments, the first proof demonstrates that the second ciphertext is a valid encryption of some plaintext under the associated public key.

At operation 708, method 700 includes generating a second proof establishing equality between the transfer value encrypted in the second ciphertext and the plaintext message committed in the cryptographic commitment.

According to embodiments, the first and second proofs comprise sigma proofs generated using two succinct Sigma protocols outside of the zero-knowledge proof circuit.

At operation 710, method 700 includes generating a zero-knowledge proof. According to embodiments, the zero-knowledge proof establishes consistency between the transfer value encrypted in the first ciphertext and the plaintext message committed in the cryptographic commitment, while enforcing additional protocol constraints required by the distributed ledger system.

At operation 712, method 700 includes assembling cryptographic artifacts associated with the transfer and submitting the assembled cryptographic artifacts to the distributed ledger system for verification. According to embodiments, the assembled artifacts include the first ciphertext, the second ciphertext, the cryptographic commitment, the first proof, the second proof, and the zero-knowledge proof. The assembled artifacts may further include other public inputs associated with the transfer.

At operation 714, method 700 includes verifying the proofs in the cryptographic artifacts. According to some embodiments, the zero-knowledge proof, the first proof of correct encryption, and the second proof of equality are verified individually. The verification further includes consistency checks to ensure that the second ciphertext referenced in the first proof matches the second ciphertext referenced in the second proof, and that the cryptographic commitment referenced in the second proof matches the cryptographic commitment enforced by the zero-knowledge proof. Accordingly, the cryptographic commitment acts as a bridge between the first homomorphic encryption scheme and the second homomorphic encryption scheme who otherwise would not bind under the zero-knowledge circuit.

At operation 716, method 700 include, upon successful verification, accepting the transaction and executing state updates in accordance with the verified encrypted transfer value. According to embodiments, the state updates include homomorphically adding the first ciphertext to a positive balance ciphertext corresponding to a receiver and homomorphically adding the second ciphertext to a decryptable balance ciphertext. According to embodiments, the state updates further include committing the first ciphertext to a Merkle tree maintained by the distributed ledger, wherein the second ciphertext is excluded from the Merkle tree. A receiver of the transfer value can then decrypt the second ciphertext using a private key corresponding to the second homomorphic encryption scheme to recover the transfer value.

The techniques described herein (for example, method 700) may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

In some implementations, one or more operation blocks of FIG. 7 may be performed by a processor circuit executing instructions stored in a memory circuit, in a client device, a remote server or a database, communicatively coupled through a network (for example, processors 205, memories 220, participant 110, participant 130, database(s) 152, and network 150).

Although FIG. 7 shows example blocks of method 700, in some implementations, the method 700 may include additional blocks, fewer blocks, different blocks, or differently arranged blocks than those depicted in FIG. 7.

Hardware Overview

Figure 8:
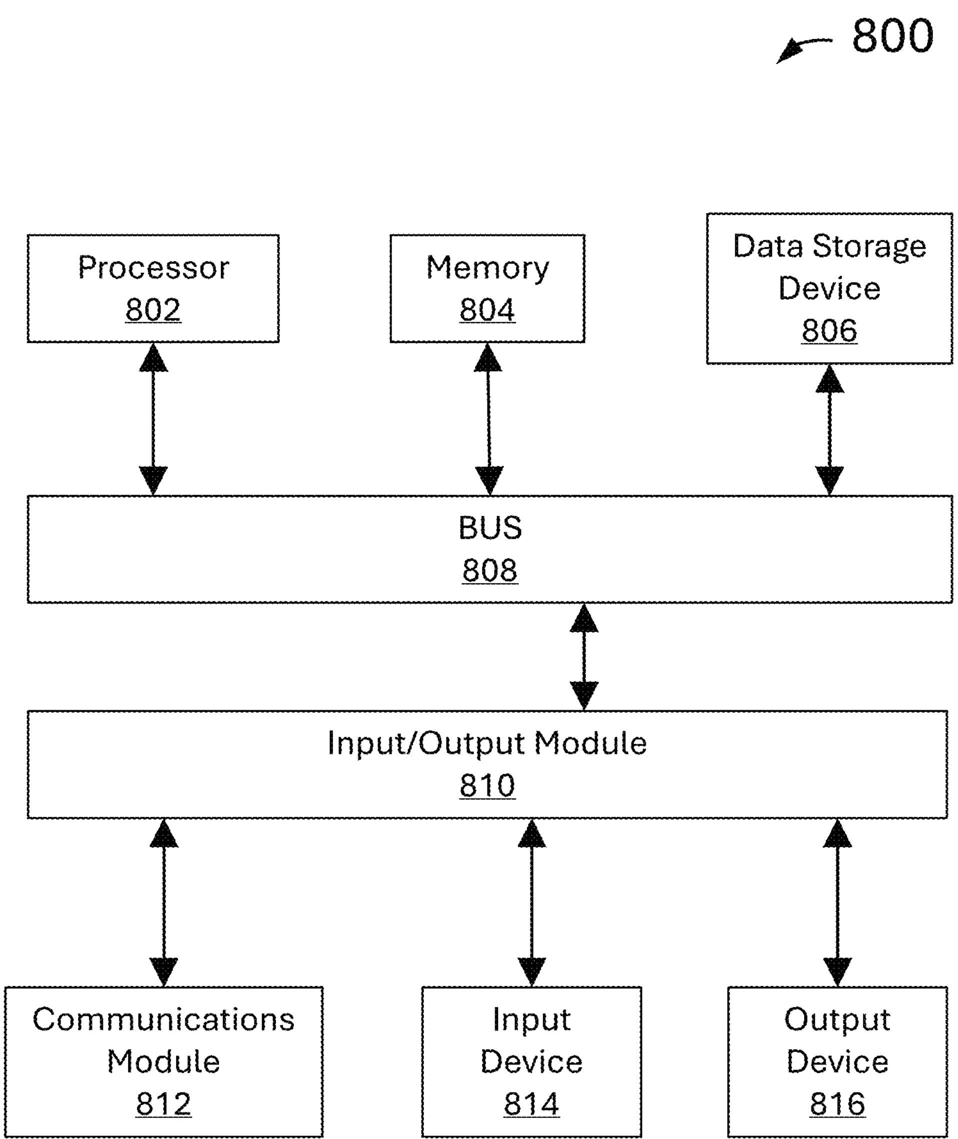
FIG. 8 is a block diagram illustrating an example computer system with which aspects of the subject technology can be implemented.

FIG. 8 is a block diagram illustrating an exemplary computer system 800 with which aspects of the subject technology can be implemented. In certain aspects, the computer system 800 may be implemented using hardware or a combination of software and hardware, either in a dedicated server, integrated into another entity, or distributed across multiple entities.

The computer system 800 (for example, server and/or participant) includes a bus 808 or other communication mechanism for communicating information, and a processor 802 (for example, processors 205) coupled with the bus 808 for processing information. By way of example, the computer system 800 may be implemented with one or more processors 802. Each of the one or more processors 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 800 can include, in addition to hardware, code that creates an execution environment for the computer program in question, for example, code that constitutes processor firmware, a protocol stack, a database management system, an operating system, or a combination of one or more of them stored in an included memory 804, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. Processor 802 and memory 804 can be supplemented by, or incorporated in, special purpose logic circuitry.

The instructions may be stored in memory 804 and implemented in one or more computer program products, i.e., one or more modules of computer program instructions encoded on a computer-readable medium for execution by, or to control the operation of, the computer system 800, and according to any method well-known to those of skill in the art, including, but not limited to, computer languages such as data-oriented languages (for example, SQL, dBase), system languages (for example, C, Objective-C, C++, Assembly), architectural languages (for example, Java, .NET), and application languages (for example, PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by the processor 802.

A computer program as discussed herein does not necessarily correspond to a file in a file system. A program can be stored in a portion of a file that holds other programs or data (for example, one or more scripts stored in a markup language document), in a single file dedicated to the program in question, or in multiple coordinated files (for example, files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 800 further includes a data storage device 806 such as a magnetic disk or optical disk, coupled to bus 808 for storing information and instructions. The computer system 800 may be coupled via input/output module 810 to various devices. The input/output module 810 can be any input/output module. Exemplary input/output modules 810 include data ports such as USB ports. The input/output module 810 is configured to connect to a communications module 812. Exemplary communications modules 812 include networking interface cards, such as Ethernet cards and modems. In certain aspects, the input/output module 810 is configured to connect to a plurality of devices, such as an input device 814 and/or an output device 816. Exemplary input devices 814 include a keyboard and a pointing device, for example, a mouse or a trackball, by which a user can provide input to the computer system 800. Other kinds of input devices can be used to provide for interaction with a user as well, such as a tactile input device, visual input device, audio input device, or brain-computer interface device. For example, feedback provided to the user can be any form of sensory feedback, for example, visual feedback, auditory feedback, or tactile feedback, and input from the user can be received in any form, including acoustic, speech, tactile, or brain wave input. Exemplary output devices 816 include display devices such as an LCD (liquid crystal display) monitor, for displaying information to the user.

According to one aspect of the present disclosure, the above-described systems can be implemented using a computer system 800 in response to the processor 802 executing one or more sequences of one or more instructions contained in the memory 804. Such instructions may be read into memory 804 from another machine-readable medium, such as data storage device 806. Execution of the sequences of instructions contained in the main memory 804 causes the processor 802 to perform the process steps described herein. One or more processors in a multi-processing arrangement may also be employed to execute the sequences of instructions contained in the memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, for example, such as a data server, or that includes a middleware component, for example, an application server, or that includes a front end component, for example, a client computer having a graphical user interface or a Web browser through which a user can interact with an implementation of the subject matter described in this specification, or any combination of one or more such back end, middleware, or front end components. The components of the system can be interconnected by any form or medium of digital data communication, for example, a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 800 can include clients and servers. A client and server are generally remote from each other and typically interact through a communication network. The relationship of client and server arises by virtue of computer programs running on the respective computers and having a client-server relationship to each other. The computer system 800 can be, for example, and without limitation, a desktop computer, laptop computer, or tablet computer. The computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 802 for execution. Such a medium may take many forms, including, but not limited to, non-volatile media, volatile media, and transmission media. Non-volatile media include, for example, optical or magnetic disks, such as the data storage device 806. Volatile media include dynamic memory, such as the memory 804. Transmission media include coaxial cables, copper wire, and fiber optics, including the wires that comprise the bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Many of the above-described features and applications may be implemented as software processes that are specified as a set of instructions recorded on a computer-readable storage medium (alternatively referred to as computer-readable media, machine-readable media, or machine-readable storage media). When these instructions are executed by one or more processing unit(s) (for example, one or more processors, cores of processors, or other processing units), they cause the processing unit(s) to perform the actions indicated in the instructions. Examples of computer-readable media include, but are not limited to, RAM, ROM, read-only compact discs (CD-ROM), recordable compact discs (CD-R), rewritable compact discs (CD-RW), read-only digital versatile discs (for example, DVD-ROM, dual-layer DVD-ROM), a variety of recordable/rewritable DVDs (for example, DVD-RAM, DVD-RW, DVD+RW, etc.), flash memory (for example, SD cards, mini-SD cards, micro-SD cards, etc.), magnetic and/or solid state hard drives, ultra-density optical discs, any other optical or magnetic media, and floppy disks. In one or more embodiments, the computer-readable media does not include carrier waves and electronic signals passing wirelessly or over wired connections, or any other ephemeral signals. For example, the computer-readable media may be entirely restricted to tangible, physical objects that store information in a form that is readable by a computer. In some embodiments, the computer-readable media is non-transitory computer-readable media, or non-transitory computer-readable storage media.

In one or more embodiments, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network. While the above discussion primarily refers to microprocessor or multi-core processors that execute software, one or more embodiments are performed by one or more integrated circuits, such as application specific integrated circuits (ASICs) or field programmable gate arrays (FPGAs). In one or more embodiments, such integrated circuits execute instructions that are stored on the circuit itself.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

It should be understood that the original applicant herein determines which technologies to use and/or productize based on their usefulness and relevance in a constantly evolving field, and what is best for it and its users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize user privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the user's privacy settings or preferences. It should also be understood that the original applicant intends that the systems and methods described herein, if implemented or used by other entities, be in compliance with privacy policies and practices that are consistent with its objective to respect the user's privacy.

What is claimed is:

1. A computer-implemented method for implementing secure transfers in a distributed ledger system, the method comprising:

encrypting a transfer value using a first homomorphic encryption scheme to generate a first ciphertext and a second homomorphic encryption scheme to generate a second ciphertext;

generating a cryptographic commitment committing a plaintext message corresponding to the transfer value using a commitment scheme;

generating a first proof establishing correctness of the second ciphertext under the second homomorphic encryption scheme;

generating a second proof establishing equality between the transfer value encrypted in the second ciphertext and the plaintext message committed in the cryptographic commitment;

verifying the first proof to confirm that the second ciphertext is a valid encryption of the transfer value under the second homomorphic encryption scheme;

verifying the second proof to confirm equality between the transfer value encrypted in the second ciphertext and the plaintext message committed in the cryptographic commitment;

generating a third proof establishing equality between the transfer value encrypted in the first ciphertext and the plaintext message committed in the cryptographic commitment; and submitting the first ciphertext, the second ciphertext, the cryptographic commitment, the first proof, the second proof, and the third proof to the distributed ledger system.

2. The computer-implemented method of claim 1, wherein the first homomorphic encryption scheme is compatible with a zero-knowledge proof circuit, and the second homomorphic encryption scheme is natively incompatible with the zero-knowledge proof circuit.

3. The computer-implemented method of claim 2, wherein the first proof and the second proof are generated based on Sigma protocols executed external to the zero-knowledge proof circuit.

4. The computer-implemented method of claim 1, further comprising:

verifying the third proof to confirm that the first ciphertext encrypts the transfer value corresponding to the plaintext message committed in the cryptographic commitment.

5. The computer-implemented method of claim 1, further comprising:

verifying that the second ciphertext referenced in the first proof is identical to the second ciphertext referenced in the second proof; and verifying that the cryptographic commitment referenced in the second proof is identical to the cryptographic commitment referenced in the third proof.

6. The computer-implemented method of claim 1, further comprising:

homomorphically adding the first ciphertext to a positive balance ciphertext corresponding to a receiver and homomorphically adding the second ciphertext to a decryptable balance ciphertext.

7. The computer-implemented method of claim 1, further comprising:

committing the first ciphertext to a Merkle tree maintained by the distributed ledger, wherein the second ciphertext is excluded from the Merkle tree.

8. The computer-implemented method of claim 1, wherein the first homomorphic encryption scheme is an elliptic-curve-based additive homomorphic encryption scheme.

9. The computer-implemented method of claim 1, wherein the second homomorphic encryption scheme is a composite-modulus homomorphic encryption scheme supporting plaintext recovery.

10. The computer-implemented method of claim 1, wherein a receiver of the transfer value decrypts the second ciphertext using a private key corresponding to the second homomorphic encryption scheme to recover the transfer value.

11. A system for implementing secure transfers in a distributed ledger system, comprising:

one or more processors; and a memory comprising instructions stored thereon, which when executed by the one or more processors, causes the one or more processors to:

encrypt a transfer value using a first homomorphic encryption scheme to generate a first ciphertext and a second homomorphic encryption scheme to generate a second ciphertext;

generate a cryptographic commitment committing a plaintext message corresponding to the transfer value using a commitment scheme;

generate a first proof establishing correctness of the second ciphertext under the second homomorphic encryption scheme;

generate a second proof establishing equality between the transfer value encrypted in the second ciphertext and the plaintext message committed in the cryptographic commitment;

verify the first proof to confirm that the second ciphertext is a valid encryption of the transfer value under the second homomorphic encryption scheme;

verify the second proof to confirm equality between the transfer value encrypted in the second ciphertext and the plaintext message committed in the cryptographic commitment;

generate a third proof establishing equality between the transfer value encrypted in the first ciphertext and the plaintext message committed in the cryptographic commitment; and submit the first ciphertext, the second ciphertext, the cryptographic commitment, the first proof, the second proof, and the third proof to the distributed ledger system.

12. The system of claim 11, wherein the first homomorphic encryption scheme is compatible with a zero-knowledge proof circuit, and the second homomorphic encryption scheme is natively incompatible with the zero-knowledge proof circuit.

13. The system of claim 12, wherein the first proof and the second proof are generated based on Sigma protocols executed external to the zero-knowledge proof circuit.

14. The system of claim 11, wherein the instructions, when executed by at least one of the one or more processors, further causes the system to:

verify the third proof to confirm that the first ciphertext encrypts the transfer value corresponding to the plaintext message committed in the cryptographic commitment;

verify that the second ciphertext referenced in the first proof is identical to the second ciphertext referenced in the second proof; and verify that the cryptographic commitment referenced in the second proof is identical to the cryptographic commitment referenced in the third proof.

15. The system of claim 11, wherein the instructions, when executed by at least one of the one or more processors, further causes the system to homomorphically add the first ciphertext to a positive balance ciphertext corresponding to a receiver and homomorphically add the second ciphertext to a decryptable balance ciphertext, wherein a receiver of the transfer value decrypts the second ciphertext using a private key corresponding to the second homomorphic encryption scheme to recover the transfer value.

16. The system of claim 11, wherein the instructions, when executed by at least one of the one or more processors, further causes the system to commit the first ciphertext to a Merkle tree maintained by the distributed ledger, wherein the second ciphertext is excluded from the Merkle tree.

17. The system of claim 11, wherein the first homomorphic encryption scheme is an elliptic-curve-based additive homomorphic encryption scheme, and the second homomorphic encryption scheme is a composite-modulus homomorphic encryption scheme supporting plaintext recovery.

18. A non-transitory computer-readable medium storing a program for implementing secure transfers in a distributed ledger system, which when executed by a computer, configures the computer to:

encrypt a transfer value using a first homomorphic encryption scheme to generate a first ciphertext and a second homomorphic encryption scheme to generate a second ciphertext;

generate a cryptographic commitment committing a plaintext message corresponding to the transfer value using a commitment scheme;

generate a first proof establishing correctness of the second ciphertext under the second homomorphic encryption scheme;

generate a second proof establishing equality between the transfer value encrypted in the second ciphertext and the plaintext message committed in the cryptographic commitment;

verify the first proof to confirm that the second ciphertext is a valid encryption of the transfer value under the second homomorphic encryption scheme;

verify the second proof to confirm equality between the transfer value encrypted in the second ciphertext and the plaintext message committed in the cryptographic commitment;

generate a third proof establishing equality between the transfer value encrypted in the first ciphertext and the plaintext message committed in the cryptographic commitment; and submit the first ciphertext, the second ciphertext, the cryptographic commitment, the first proof, the second proof, and the third proof to the distributed ledger system.

* * * * *